Dec. 30, 1952         R. A. HOLLEMBEAK ET AL         2,623,351
       WINDSHIELD WIPER CONTROL SYSTEM HAVING MEANS
           TO ISOLATE BOOSTER PUMP DURING PARKING
                   Filed April 24, 1950

INVENTORS
RULUFF A. HOLLEMBEAK
WENFORD E. HIGHLEY
RUSSELL F. SMITH
BY
George R. Ericson
ATTORNEY Patented Dec. 30, 1952

2,623,351

UNITED STATES PATENT OFFICE 2,623,351

WINDSHIELD WIPER CONTROL SYSTEM HAVING MEANS TO ISOLATE BOOSTER PUMP DURING PARKING

Ruluff A. Hollembeak, Wenford E. Highley, and Russell F. Smith, St. Louis, Mo., assignors to Carter Carburetor Corporation, St. Louis, Mo., a corporation of Delaware Application April 24, 1950, Serial No. 157,694

2 Claims. (Cl. 60—14)

This invention relates to vehicle accessory systems and consists particularly in a novel control for such systems operated by fluid pressure.

Where a vehicle accessory includes a suction motor which is operated by intake manifold suction, it is customary to provide a suction booster for maintaining the accessory in operation at times when the engine suction drops excessively. In the case of a windshield wiper, the operating motor is maintained out of operation most of the time, that is, in a parking position, by a suction by-pass which directs greatly reduced suction to one side of the motor so as to maintain the wiper blade always out of the driver's range of vision. There is, thus, a constant supply of suction to the motor which keeps the booster pump in operation, though at a reduced rate, and shortens its life.

It is the main object of the present invention to provide, in a fluid pressure system of the above type, means to cut out the suction booster when the wiper motor is in parking position at which time the manifold vacuum is always sufficient to maintain the wiper blade properly parked.

Figure 1:
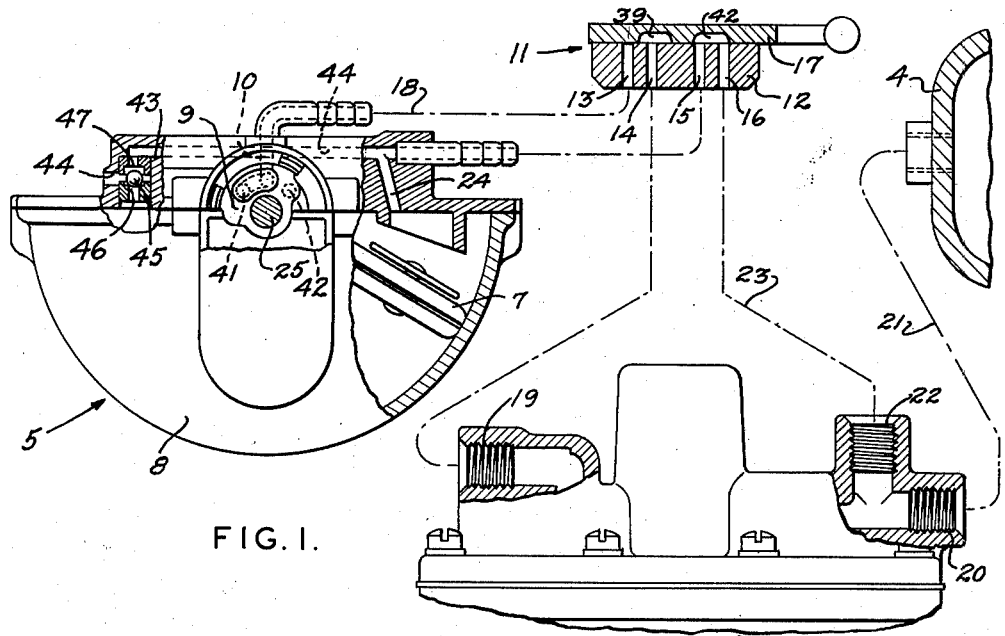

This object and other more detailed objects hereafter appearing are obtained by the structure illustrated in the accompanying drawing in which Fig. 1 is a view partly sectioned and partly diagrammatic, illustrating the principal parts of a windshield wiper system embodying the present invention.

Figure 2:
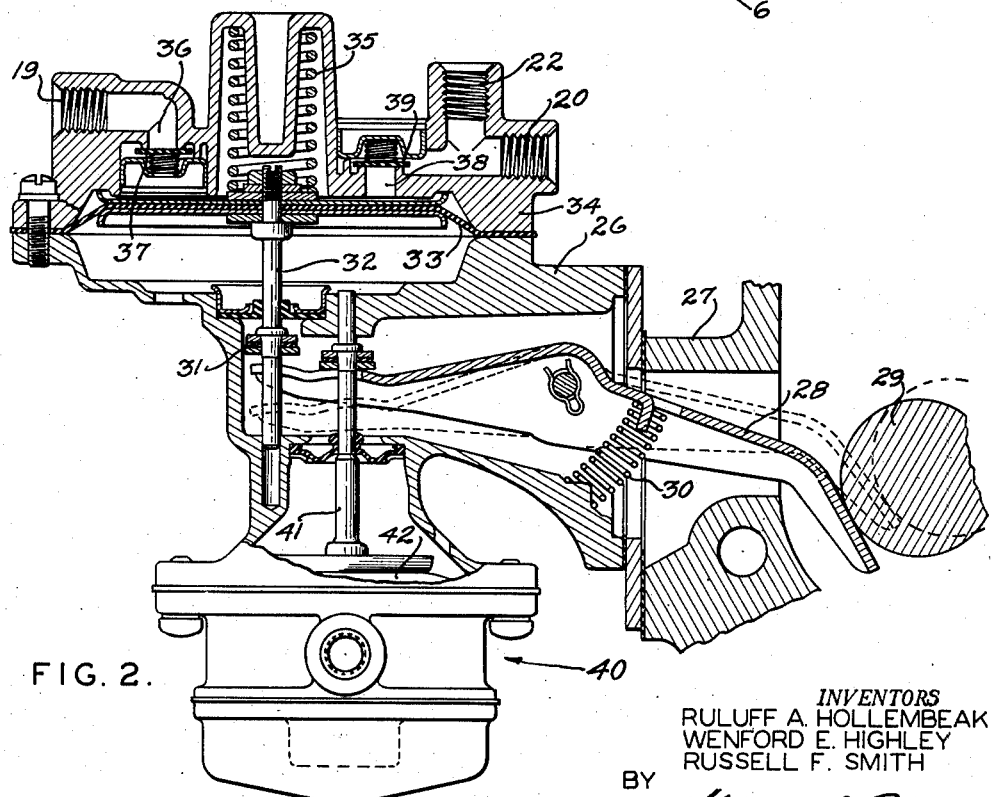

Fig. 2 is a side view, mostly in section, showing the booster pump.

Fig. 1 illustrates at 4 a part of the intake manifold of an internal combustion engine, at 5 a windshield wiper motor of a well known type, and at 6 a suction booster pump. The wiper motor is of a known type, as shown, for instance, in Patent No. 2,298,734. It incorporates an oscillating vane 7 within a semicircular body 8 and which operates the reciprocating valve mechanism, indicated at 9, for alternately directing suction from the main motor operating port 10 into ports leading through passages 43 and 44 to the opposite sides of vane 7. Suction connection 43 has an atmospheric vent 43a controlled by a check ball 45 acting in connection with seats 46 and 47 to direct atmosphere to the side of the valve not affected by suction.

A parking control is shown at 11 including a valve plate 12 with pair of ports 13 and 14 and 15 and 16 controlled by recesses 39 and 42 in a manual slide valve 17 which is conveniently positioned for the vehicle driver. A suction connection 18 extends from main operating port 10 of the motor through control valve ports 13 and 14 and thence to threaded inlet connection 19 of the suction booster. A threaded exhaust connection 20 of the booster is connected by tubing, indicated at 21 to engine intake manifold 4. A by-pass connection 22 on the exhaust side of the booster pump is connected by tubing, indicated at 23, to the second set of ports 15, 16, of the control valve plate and thence to parking port 24 of the suction motor whereby sub-atmospheric pressure is constantly directed to one side only of the motor vane so as to maintain the vane, its shaft 25, and the attached windshield wiper blade (not shown) in an extreme position.

The booster pump, as best shown in Fig. 2, comprises a body 26 secured to the lower portion 27 of the engine and pivotally mounting a lever 28 having one end urged against engine operated cam 29 by a spring 30. The other end of the lever underlies a pad 31 on a stem 32 centrally secured to a diaphragm 33 clamped between body 26 and a cap member 34. A coiled spring 35 constantly urges the diaphragm downwardly At one side of the cap member there is provided an inlet port 36 controlled by a spring pressed check valve 37. At the other side is an exhaust port 38 controlled by a spring pressed check 39.

Below the booster is a fuel pump, generally indicated at 40 and operated by lever 28 and a stem 41 secured to a diaphragm 42. This pump is covered in a copending application, Serial No. 728,979, filed February 17, 1947, in the name of Irven E. Coffey.

During operation of the vehicle engine, reduced pressure in intake manifold 4 draws ambient atmosphere through the windshield wiper motor and also through the booster pump pressure chamber above diaphragm 33. If parking control 17 is in operating position, that is, with its control recess 39 connecting ports 13 and 14, suction will be applied to motor operating port 10 so as to cause the motor to oscillate in the normal manner and to operate the windshield wiper blade or blades. If the depression in the booster pressure chamber is sufficient to overcome spring 35, the diaphragm will be maintained in a raised position, as shown, and lever 28 will reciprocate in part or wholly idly. However, as this depression drops, particularly, when the wiper motor is in operation, spring 35 will expand, lowering the diaphragm, and moving pad 31 within the range of movement of operating lever 28. This will cause the diaphragm to reciprocate and to act as a suction pump, insuring the maintenance of at least a minimum depression in the windshied wiper operating system.

When windshield wiper parking control 17 is shifted so as to move recess 42 in position to connect ports 15 and 16, the supply of suction will be cut off from main operating port 10 and will be diverted to parking port 24 so as to constantly maintain vane 7 and the attached wiper blade in an extreme position. There frequently results a leakage of air through the motor and into the intake manifold during parking. In order to prevent this bleed from causing continued operation of the booster motor, as would be the case if this bleed were directed through the booster, suction is supplied to the parking port through tube 23 connecting threaded by-pass boss 22 on the discharge side of the suction booster through parking ports 15 and 16 and thence to parking port 24. Thus, the parking air bleed through the wiper motor is applied directly to the intake manifold rather than the booster pump and its effect upon the booster is substantially eliminated. The result is that the booster pump will be maintained out of operation during the substantial portion of the time when the windshield wiper is parked. Consequently, the life of the booster and particularly, the diaphragm and valve thereof will be materially increased.

No particular type of fluid pressure windshield wiper motor or of booster pump is essential. A super atmospheric system may be substituted for the suction system shown. These and other parts may be modified as will occur to those skilled in the art and the exclusive use of all modifications as come within the scope of the appended claims is contemplated.

We claim:

1. A subatmospheric fluid pressure system for a suction motor operated accessory of a vehicle having an internal combustion engine comprising operating and parking suction connections between the engine intake manifold and the accessory motor, a suction booster pump operated by the engine and interposed in said operating connection, said booster pump incorporating means preventing pumping action thereof when exposed to relatively high suction in said operating connection, a parking control for directing suction selectively between said operating and parking connections, and a valve device operable with said parking control for disconnecting said pump from the accessory motor when said control is in the parking position.

2. A subatmospheric fluid pressure accessory system for vehicles having internal combustion engines comprising an accessory suction motor having normal operating and parking ports, suction connections between the engine intake manifold and said ports, respectively, a suction booster pump incorporating a reciprocating wall normally urged in one direction by a spring and in the other direction by suction acting against said spring, fluid connections between said pump and said operating suction connection and the engine manifold, a parking control for the accessory motor adapted to divert suction from said normal operating connection to said parking connection and vice versa, and a valve device operable with said parking control for cutting off the suction connection between said booster motor and said normal operating suction connection during parking.

RULUFF A. HOLLEMBEAK.
WENFORD E. HIGHLEY.
RUSSELL F. SMITH.

REFERENCES CITED

The following references are of record in the file of this patent:

UNITED STATES PATENTS

| Number | Name | Date |
|---|---|---|
| 2,002,318 | Hueber et al. | May 21, 1935 |
| 2,021,857 | Hueber | Nov. 19, 1935 |
| 2,348,346 | Horton et al. | May 9, 1944 |
| 2,520,650 | Oishei et al. | Aug. 29, 1950 |
| 2,538,327 | Rappl | Jan. 16, 1951 |